Nov. 13, 1956  J. E. SNOW  2,770,431
AIRCRAFT BARRIER
Filed Jan. 13, 1955  5 Sheets-Sheet 3
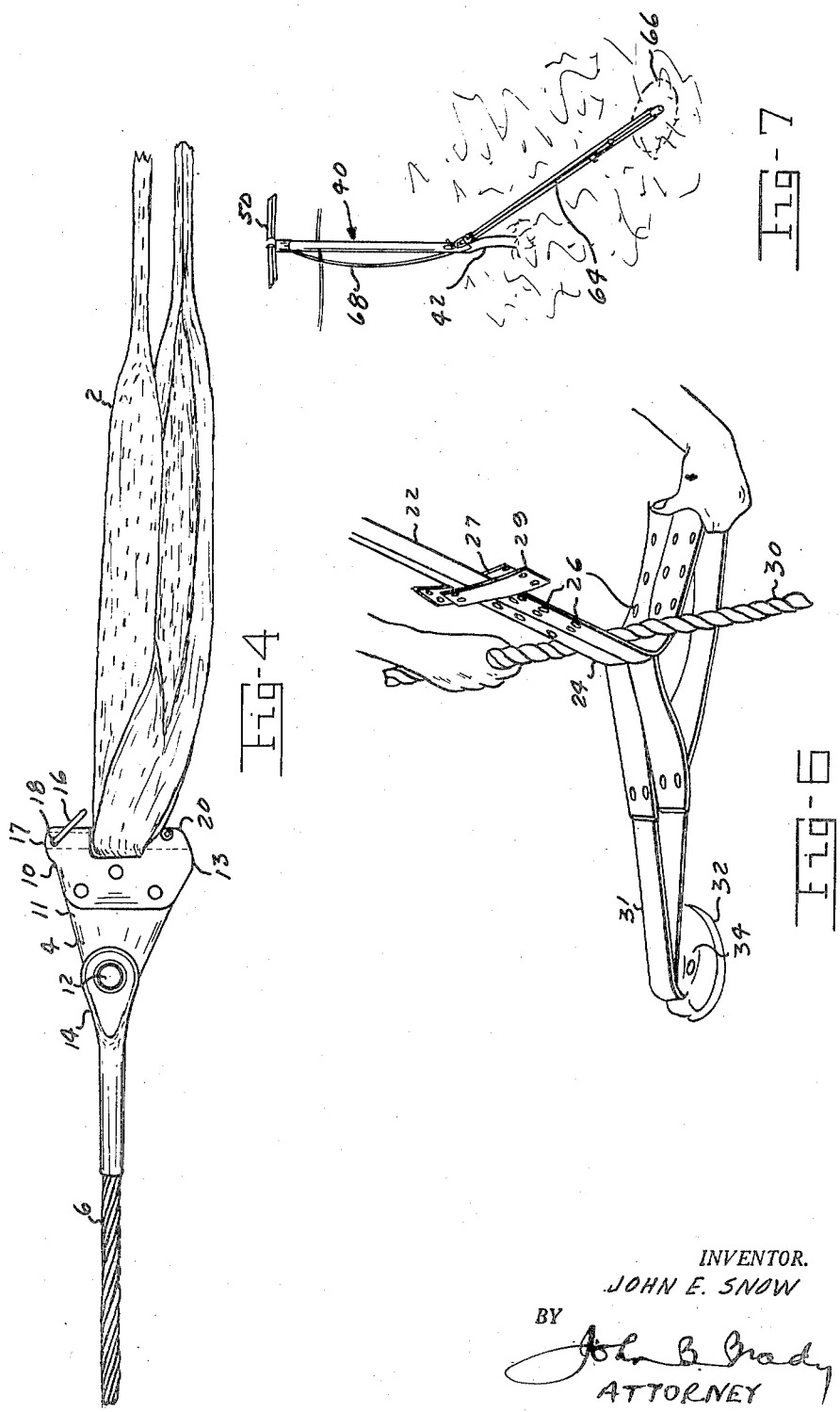
INVENTOR.
JOHN E. SNOW
BY
John B. Grady
ATTORNEY Nov. 13, 1956
J. E. SNOW
2,770,431
AIRCRAFT BARRIER
Filed Jan. 13, 1955
5 Sheets-Sheet 4
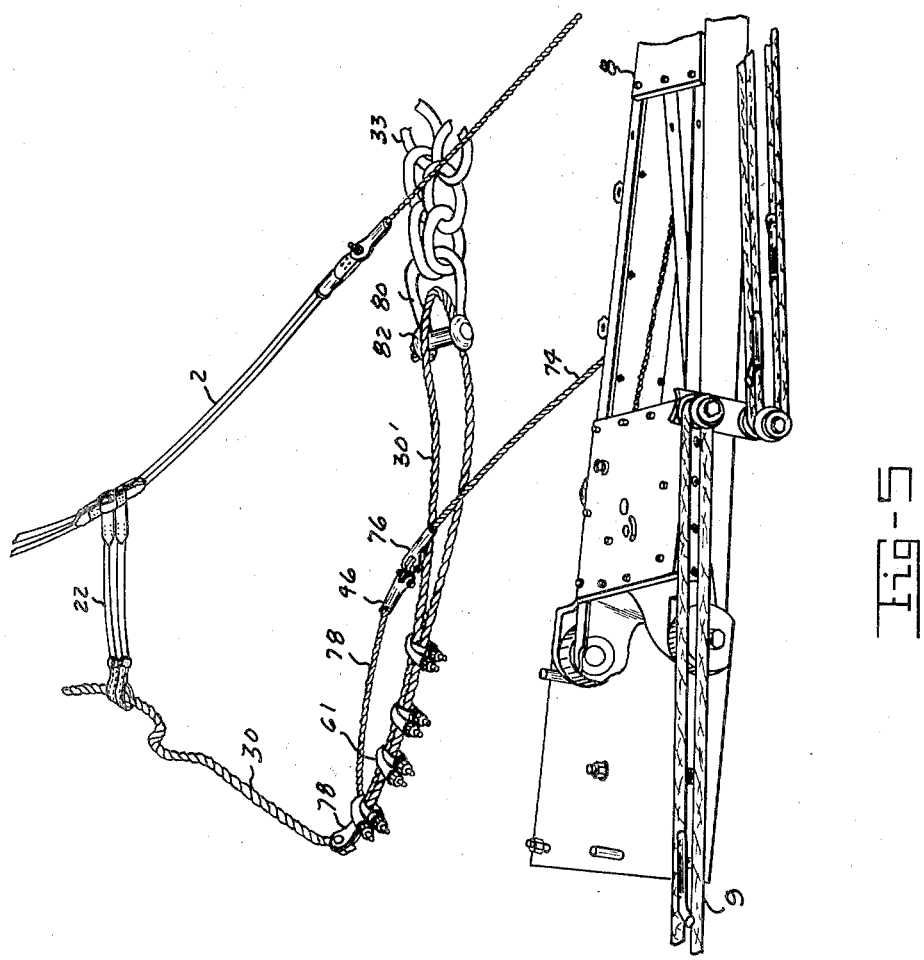
INVENTOR.
JOHN E. SNOW.
BY
John B Brady
ATTORNEY Nov. 13, 1956 J. E. SNOW 2,770,431
AIRCRAFT BARRIER
Filed Jan. 13, 1955 5 Sheets-Sheet 5
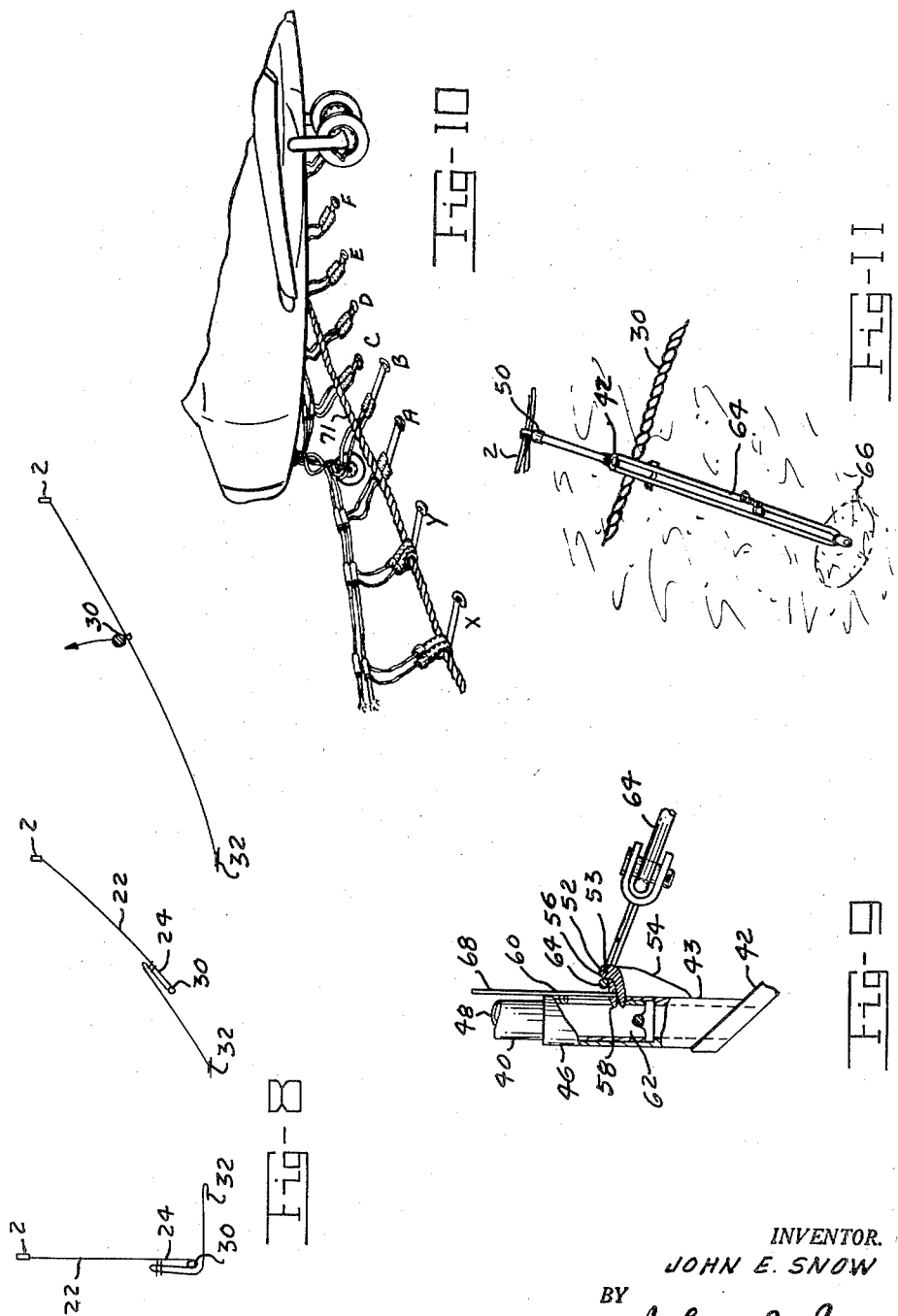
INVENTOR.
JOHN E. SNOW
BY John B. Brady
ATTORNEY United States Patent Office 2,770,431
Patented Nov. 13, 1956

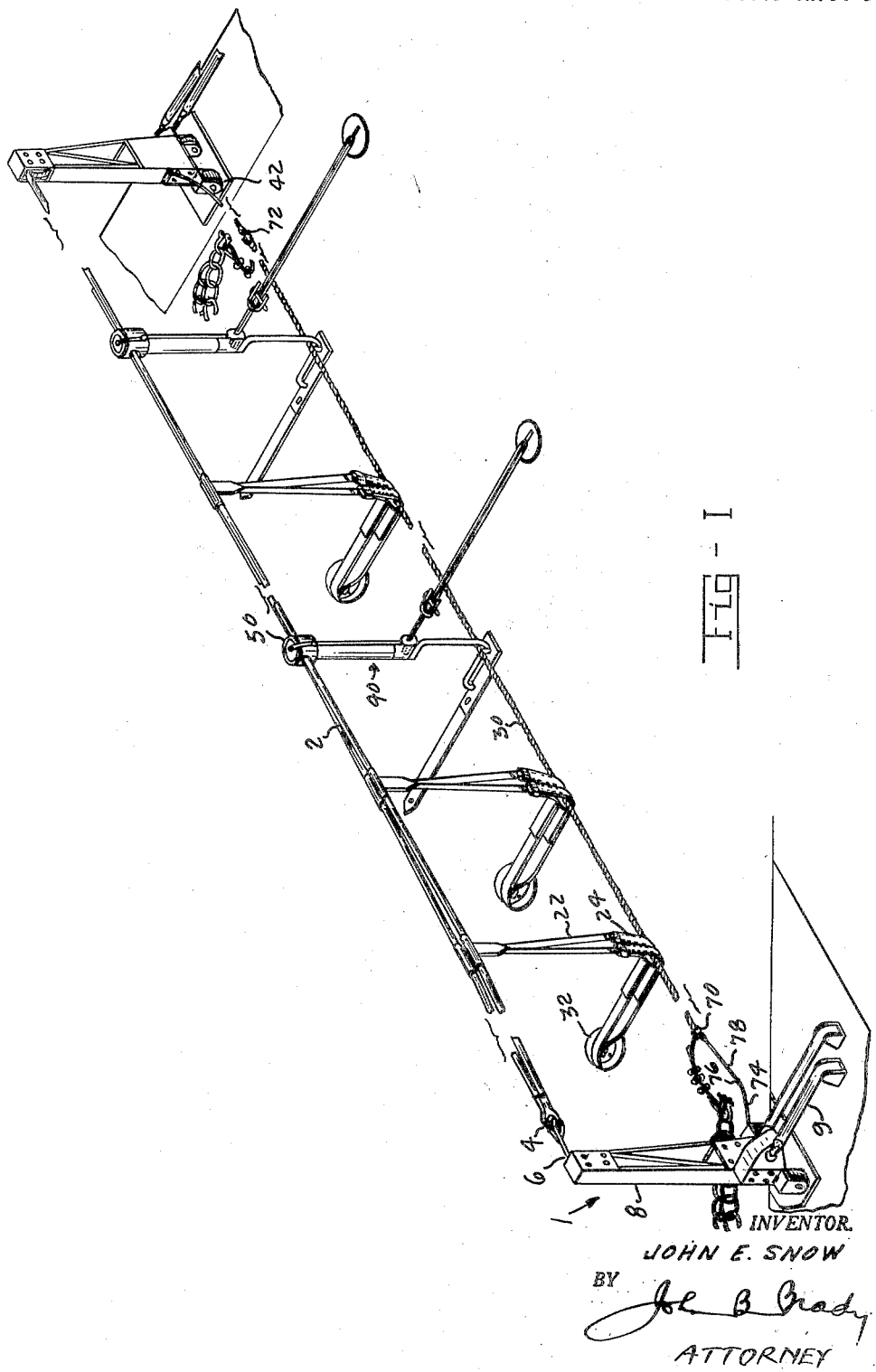

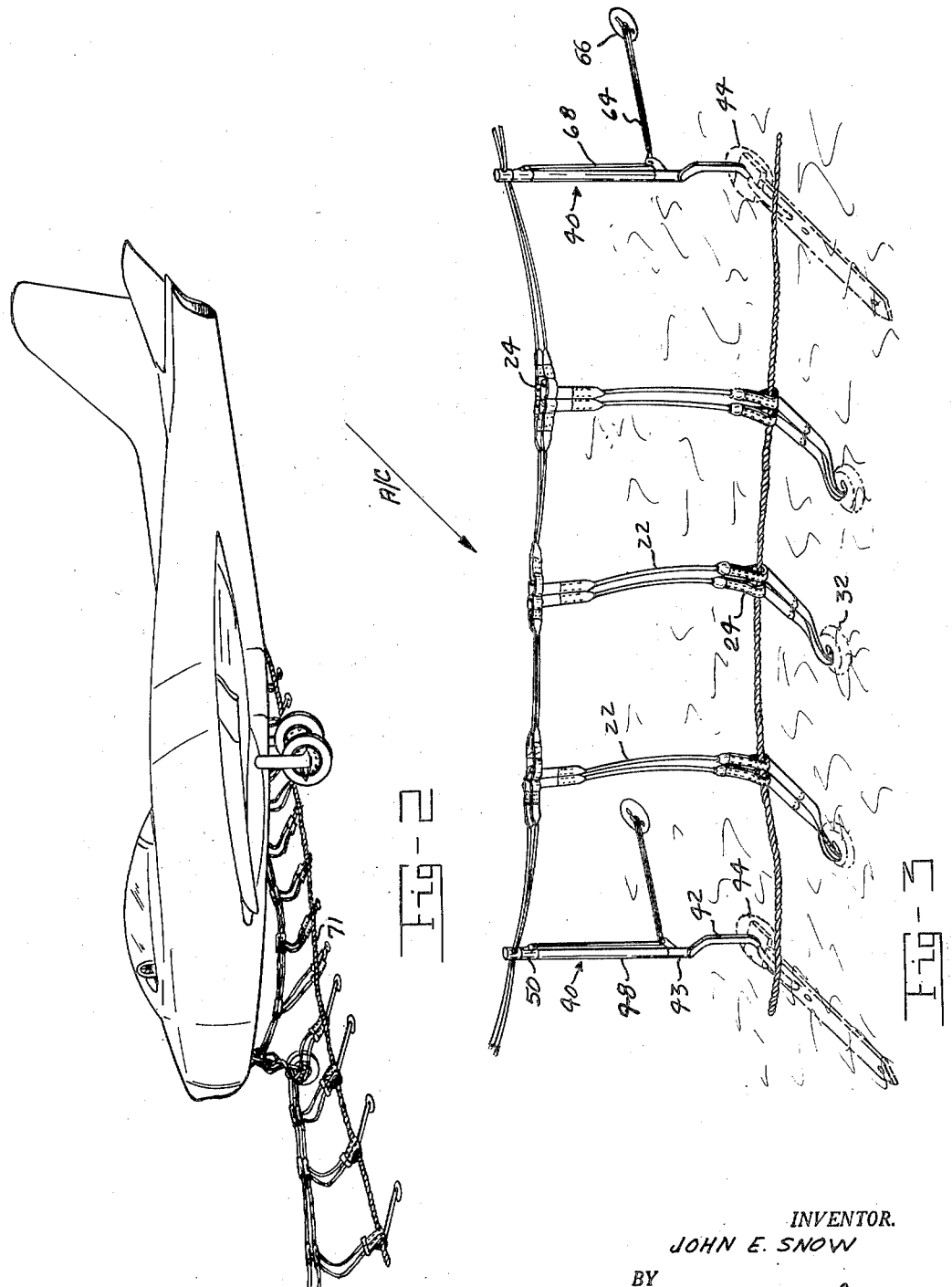

2,770,431

AIRCRAFT BARRIER

John E. Snow, Hillsdale, N. J., assignor to Acme Precision Products, Inc., Dayton, Ohio, a corporation of Ohio Application January 13, 1955, Serial No. 481,591

8 Claims. (Cl. 244—110)

My invention relates to that class of devices known as aircraft barriers and more particularly to aircraft barriers designed to absorb the kinetic energy of jet aircraft.

Since the transverse widths of the present land runways vary from one hundred fifty feet to four hundred feet, many problems not present in carrier barriers must be faced and solved before a barrier is feasible for use on land runways.

The barriers with which I am familiar, employing an arresting cable flung into the air to engage an aircraft, have proven unsatisfactory from the standpoint of uniformity of performance. I have found that attaching the arresting cable directly to the drag produces a very erratic performance. Sometimes the arresting cable is flung into the air in the form of an arc or loop outside the point of engagement of the aircraft with the barrier and thus entangles the aircraft. This causes the arresting cable to engage parts of the aircraft not stressed for the forces exerted with the result that substantial damage is done to the skin and frame of the aircraft. If the arc or loop of the arresting cable is not sufficiently high at the proper time to engage either the main landing gear, the bomb or rocket launcher racks, or the in-board fuel tank hangers, the barrier will fail and the aircraft will not be engaged to the drag. If there are no bomb or rocket launcher racks, or in-board fuel tank hangers on the aircraft, the arc or loop in the arresting cable must be sufficiently high to engage the main landing gear struts over the main landing gear wheels. The arc or loop of this type of arresting cable must be raised into the air (after the nose wheel of the aircraft has passed over the arresting cable) to a height of approximately three feet while the aircraft moves forward only approximately six feet if the arresting cable is to engage bomb or rocket launcher racks, or in-board fuel tank hangers. The arc or loop of the arresting cable must also be approximately two and one-half feet to three feet high if it is to engage the main landing gear struts which are approximately nineteen and one-half feet in the rear of the nose wheel, depending upon the type of aircraft. The speed of the aircraft will vary from thirty miles per hour to one hundred and ninety miles per hour. Hence, the performance of the arresting cable takes place in a very short space of time.

My invention is directed to controlling the performance of the arc or loop in the arresting cable as it is flung into the air to engage the aircraft. In the practice of my invention, I employ, as far as possible, the present arrangement of this type of aircraft barrier. Thus, I employ the usual actuator strap and lifter straps to snap or raise the arresting cable into position to engage the aircraft. However, I have discovered a means of controlling the performance of the arc or loop developed in the arresting cable upon an aircraft crashing the barrier.

In order to provide a barrier that is uniform for any width runway, I have found it is necessary that the actuator strap be supported in substantially the same height above the runway. I provide intermediate supports for installation approximately every fifty feet of transverse distance so that the actuator strap will not sag more than approximately two inches between stanchions. These intermediate stanchions are so constructed that they do not endanger the aircraft when relieved of their supporting function, even if hit by the aircraft.

As set forth above the problem encountered in using arresting cables of the kind herein described is that the nose wheel of the aircraft must pass over the arresting cable which must then be flung into a wave or loop sufficiently high at the point where the nose wheel travelled over it to engage one of the two main points which are braced to hold such a cable without damage to the aircraft. These points are the main landing gear struts or the bomb hangers which may also be employed to hold fuel tanks or rocket launchers. The loop has to be approximately three to four feet high to pass over these fuel tanks or bombs and engage the hangers, while the aircraft has travelled only a distance of approximately six feet. If the main landing gear struts are to be engaged, then the loop must be higher than two and one-half feet but less than five feet after the aircraft has travelled about fifteen to nineteen and one-half feet from the point where the nose wheel passed over the arresting cable, depending upon the type of aircraft. Accordingly, it is easy to understand why an uncontrolled wave engendered into the arresting cable produces erratic results.

In practice I prefer to employ a 7/8", 6 x 19 wire rope as an arresting cable. Of course this cable size may be increased for greater loads. The arresting cable is snapped into the air by the lifter straps being stretched when the nose wheel strut of the aircraft engages the actuator strap and carries it forward. The manner of accomplishing this snapping is very important to the performance of the arresting cable. The lifter straps, which are attached to both the actuator strap and the runway, are folded over the cable intermediate their ends and secured by sewing or by snap fasteners and formed into a loop enfolding the cable. Upon the actuator strap being stretched by the nose wheel strut, the arresting cable is freed and snapped into the air in the form of a loop or wave just before the lifter strap becomes unfastened from the runway. The loop is formed in the arresting cable at the point of engagement and it is this loop which engages the aircraft. To form this loop I provide excess cable that is lying on the runway. In other words, if the runway is one hundred fifty feet wide, I provide that the cable will be approximately one hundred fifty-three feet long. This excess cable forms the loop which engages the aircraft and then the cable is carried along, picking up the drag as the aircraft travels down the runway. Obviously, the actuator strap must be permitted to break at a predetermined point. This is usually accomplished by means of a shear pin arrangement which parts the actuator strap upon a predetermined certain pressure being exerted on it. I have found in practice that a shear pin in each end of the actuator strap adapted to shear when 3,000 pounds pressure is applied to it gives sufficient snap to the lifter straps at the point of engagement to form the desired loop in the arresting cable.

After considerable study of the problem, I discovered that a transverse wave travelling at approximately two hundred feet per second and a partially reflected tension wave travelling approximately ten thousand feet per second were combining to act on the loop of the arresting cable after it was snapped into the air to engage the aircraft. These uncontrolled waves prevented any uniformity of action in the arc or loop of the arresting cable being achieved. The loop, after it was released into the air, frequently became catenary in shape, softening to a circle and then running back into an elipse, all in the short space of time. I then endeavored to separate the partially reflected tension wave in its effect from the transverse wave. I discovered that the tension wave would tend to bring the ends of the arresting cable, if free to move, directly inwardly toward the point of impact. However, when the arresting cable was attached to the drag and the stanchion, the tension wave was reflected into several directions in varying strengths. I discovered that since the proportion of reflection of the tension wave back toward the point of impact along the arresting cable depended upon the degree of dissipation of the tension wave by the drag and the stanchion, I could control the reflection of the tension wave, and hence control the action of the arc or loop in the arresting cable, if I could direct substantially all of the tension wave back toward the point of impact. Of course, if I could completely absorb all the tension wave, I could also control the performance of the arc or loop in the arresting cable. However, I have found that reflecting substantially all of the tension wave works satisfactorily and is less expensive.

My means of accomplishing the reflection as above set forth is to provide that the arresting cable is connected to the side stanchions in such a manner that just after the arresting cable is raised by the lifter straps and before the arresting cable picks up the drag, it is jerked sharply. This jerk causes substantially all of the tension wave to be reflected along the cable toward the point of impact. Thus, if the point of impact is roughly at the center of the actuator strap, the reflected tension wave acts to increase the arc or loop in the arresting cable. Even if the point of impact is off center, I have found the reflected tension wave does not adversely effect the size or performance of the arc or loop in the arresting cable.

It is the principal object of my invention to provide an aircraft barrier for use on runways of any width, that will absorb the kinetic energy, or speed, of a jet aircraft.

It is another object of my invention to provide that the arresting cable of an aircraft barrier will uniformly engage either the bomb or rocket launcher racks, the fuel tank supports, or the main landing gear struts, of a jet aircraft without doing substantial damage.

It is another object of my invention to provide an aircraft barrier which will absorb the speed of jet aircraft from thirty to one hundred ninety miles per hour without adjustment.

It is another object of my invention to provide an aircraft barrier actuator strap stanchion or support that will disassemble upon the actuator strap being engaged by a moving aircraft by the stanchion being triggered to release engagement.

One of the objects of my invention is to control the reflected tension wave created in the arresting cable of an aircraft barrier when it is snapped into position to engage a moving aircraft, thereby permitting a loop to develop in the arresting cable which will raise the correct distance to uniformly engage the proper portions of an aircraft.

My means of accomplishing the foregoing objects may be more readily apprehended by having reference to the drawings which are appended hereto and are made a part hereof in which:

Figure 1 is a perspective view somewhat diagrammatic, showing a barrier made in accordance with my invention about to be engaged by an aircraft.

Figure 2 is a perspective view similar to Figure 1 after engagement of the barrier by an aircraft showing the beginning of the loop formed in arresting cable.

Figure 3 is a perspective view of the actuator strap and arresting cable with the barrier in erected position with two intermediate stanchions in place.

Figure 4 is a detailed view of a shear pin arrangement attached to one end of the actuator strap.

Figure 5 is a detailed view of one end of the arresting cable with the tension wave control in position.

Figure 6 is a detailed view of the lifter strap engagement of the arresting cable.

Figure 7 is a detail view of my intermediate stanchion.

Figure 8 is a schematic drawing of the progress of the unsnapping of a lifter strap as an aircraft engages the actuator strap.

Figure 9 is a detail view, partly in section of a portion of my intermediate stanchion.

Figure 10 is a detail view of Figure 2.

Figure 11 is a schematic view of my intermediate stanchion in a "down" position.

Similar numerals refer to similar parts throughout the specification.

As shown in the drawings, I provide an actuator strap 2 for the aircraft barrier indicated generally as 1, which is preferably made of woven nylon approximately one and three-quarters inches wide and three-sixteenths of an inch thick with a 10,000 pound test strength. For safety, I provide dual straps 2 but I shall refer to one only. One end of this strap 2 is attached through a shear pin assembly 4 to cable 6 which is held by the end stanchion 8. Since each end is a duplicate, I have described only one. The stanchion 8 is adapted to be raised into a vertical position when the barrier is required by means of bungee cord 9 or in any suitable manner. As shown in Figure 4, the shear pin assembly 4 is comprised of a yoke 10 riveted to a finger 11 and pivotedly attached by means of a bolt 12 to a bifurcated tongue 14 which is swedged to the cable 6, which is attached to the stanchion 8. While I have described one shear pin assembly 4 for the actuator strap 2, it is understood there are two of these, one at each end. A shear pin 16 which will shear at 3,000 pounds pull on the actuator strap 2 is inserted in the hole 18 and through the pin 17 which is attached to the yoke 10 by means of a bolt 20 to the bottom 13 of the yoke 10 as shown.

I provide a plurality of lifter straps 22 which also may be made of woven nylon, each of which may be attached to the actuator strap 2 by loops 24 around the actuator strap 2. The length of the lifter strap 22 must be as nearly exact in its measurements as possible. For safety, I provide two straps 22 for each lifter, but for convenience I shall describe only one. The straps 22 are formed into restraining loop 24 provided when the snap fasteners 26 are snapped together and are folded over an arresting cable 30 as shown in Figure 6. When the fasteners 26 are snapped together the strap 22 is firmly but detachably fastened to the arresting cable 30. Of course, the straps 22 may be lightly sewed together instead of employing the snap fasteners 26 if desired. I provide inertia straps 27 with snap fasteners 29 to insure the restraining loops 24 against premature release. I provide that the snap fasteners 26 will open on a pull of 90 to 100 pounds. It will be noted that the lower end 31 of the lifter strap 22 is firmly buttoned to an anchor plate 32 set in the runway by means of a grommet 34. However, this grommet 34 will resist separation far beyond the release load of the actuator strap fasteners 26 because the direction of pull on the grommet 34 effects a shearing action rather than a pulling force. I have provided that the grommet 34 will separate upon a pull of approximately 250 pounds.

It will thus be clear that when the actuator strap 2 is engaged by the nose wheel strut of an aircraft as shown in Figures 2 and 10 and pulled forwardly with enormous force, first the lifter strap 22 nearest the nose wheel will unfasten at the loop 24 surrounding the arresting cable and then upon further stretching of the actuator strap 2, the lifter straps 22 straighten out and snap the cable into the air upon the runway, grommet 34 being pulled out. This is schematically shown in Figure 8. Referring to Figure 10, it will be clear that the lifter straps A, B, C, D, E and F, have separated but that the lifter straps X and Y have not yet been forced open.

As set forth above, the actuator strap 2 should not be permitted to sag more than approximately two inches because the function of the actuator strap 2, as its name implies, is to actuate the cable 30. In order to accomplish this purpose, the straps 22 should be in a position to uniformly affect the cable 30 wherever the actuator strap 2 is engaged. Consequently, I provide that an intermediate stanchion indicated generally as 40 is positioned approximately every fifty feet of transverse runway. In this manner, a runway of any width may be covered by my barrier without adjustment by merely inserting my stanchion 40 as set forth above. The stanchion 40 comprises a lower bar 42 which is hinged to a base plate 44 set into the runway. As shown in Figure 9 the lower bar 42 is hollow at its upper end 46 to receive a tube 48. The lower end 62 of the tube 48 rests in the end 46 of the lower bar 42 and is inserted at its upper end into a cap 50 attached to the actuator strap 2 as shown in Figures 1 and 7.

A key 52 is mounted by a pivot 53 on a flange 54 extending outwardly from the extension 43 of the lower bar 42 substantially as shown in Figure 9. The key 52 has an ear 56 extending upwardly and a bifurcated finger 58. The tube 48 has a slot 60 adjacent its lower end 62 into which the finger 58 of the key 52 falls when the tube 48 is inserted into the bar 42. As shown in Figures 3, 7, 9 and 11, a bungee cord 64 is attached to a base plate 66 in the runway and is slipped around the ear 56 of the key 52. It will be noted that the bungee cord 64 rests just below the plane of the pivot 53 and will normally tend to keep the key 52 into a locked position. A trigger wire 68 is attached to the cap 50 and runs somewhat parallel to the tube 48 and around the bifurcation in the finger 58 just behind the bungee cord 64. The bungee cord 64 keeps the lower bar 42 in an upright position until the actuator strap 2 is engaged by an aircraft. At this point, the cap 50 which is attached to the actuator strap 2 is lifted from its position and causes the trigger wire 68 attached to it to pull upwardly on the finger 58 of the key 52. As soon as the finger 58 is raised sufficiently that the bungee cord 64 is above the plane of the pivot 53 due to the raising of the finger 58 caused by the trigger wire 68 pulling thereon, the bungee cord 64 pulls the key 52 completely up and releases the tube 48 which falls along the runway. Thus the intermediate stanchion 40 disassembles and cannot injure the aircraft even if the aircraft hits it during the forward movement. A recess may be formed in the runway for the intermediate stanchion 40 when it is in a downward position as shown in Figure 3. The bungee cord 64 will be forced to stretch further when the barrier is in a "down" position as shown in Figure 11 but it will be in substantially the same plane as the lower bar 42 and hence will not cause it to raise until the entire barrier is raised approximately 30°. The lower bar 42 is curved as shown to hold the arresting cable under it when in a downward position as shown in Figure 11.

As shown in the drawings I provide an arresting cable 30 which is positioned substantially parallel to the actuator strap 2 but is laid upon the runway. In practice I have found a ⅞", 6 x 19 wire rope very satisfactory. As shown in Figures 2 and 10, the arresting cable 30 is snapped into the air by the lifter straps 22 when they become "sprung" i. e. unsevered or unsnapped, at the point of engagement. Obviously, not all of the lifter straps will be "sprung" at the same time nor with the same degree of force. Hence, as shown in Figure 10, a curve or loop 71 is developed into the arresting cable 30. This loop 71 will have its greatest arc directly in back of the nose wheel strut. Thus the dimensional geometry of the lifter straps is very important in timing the lifting of the arresting cable 30. For this reason near uniformity is highly desirable. When the arresting cable 30 is snapped into the air, the tension wave created in it tends to draw the ends 70 and 72 of the cable directly towards each other at the center of the point of engagement. If the ends 70 and 72 of the arresting cable were unattached, the result would be a loose V formed by the arresting cable in back of the main landing gear struts or other point of engagement as the aircraft travelled down by the runway with the ends 70 and 72 approaching each other. If the ends of the arresting cable are attached to the drag only (in this case, anchor chains) the ends of the cable would jerk the loose chain links in a perpendicular direction to the path of travel of the aircraft thereby increasing the amount of the cable in the loop 71 and distorting it. I have seen this happen and have found that if the reflected tension wave can be controlled, the transverse wave unites into forming a uniform loop of the desired characteristics. Accordingly, I provide a pair of tenesion control cables 74 and 78 attached to each end 70 and 72 of the cable 30. One set of these is shown in Figure 5. Since they are identical, I shall describe only one. A small cable 74 is attached firmly to a fixed point such as the stanchion 8 near the base, that is adjacent the level of the runway such as approximately one foot above the runway, and extends to a shear pin device 76 which is similar to the shear pin 4 except that it will shear at 4,000 pounds. Another cable 78 of the same dimensions as the cable 74 extends from the shear pin device 76 to the arresting cable 30 and may be attached by cable clamp 78' as shown. The cables 74 and 78 are slack and a portion of the cable 78 adjacent the arresting cable 30 rests on the surface of the runway in the same way that the arresting cable 30 lies in a slack condition on the surface of the runway. The end of the arresting cable 30 may be attached to the drag 33 by means of a loop 30' passing through a shackle 80 held by a screw pin 82 and attached to the cable by clamp 61. Since the success of my invention resides in the cables 74 and 78 controlling the reflected tension wave created when the lifter straps 22 snap the cables 30 into the air, I carefully measure the cables 74 and 78 to assure that as soon as the arresting cable is first lifted above the runway the cables 74 and 78 become taut. When the further travel of the aircraft against the actuator strap 2 forces the lifter straps nearest the point engaged by the nose wheel strut to snap the arresting cable 30 into the shape of a loop as shown in Figure 10, the cables 74 and 78 have been tightened to the shearing point of the shear pin device 76. At this instant, just before the shear is effected and the cables 74 and 78 are separated, the reflected tension wave is controlled by directing the reflection through the cables 74 and 78 back through cable 30. From the drawings it will be clear that when the shear pin device 76 separates, the arresting cable 30 is free to begin to pick up the first links of the drag 33 in a turn of approximately 180° and gradually pick up more and more links which sweep into a drag forming a rough cuneiform figure behind the aircraft as it progresses down the runway. Since the reflected tension wave is controlled, the loop 71 formed in the arresting cable 30 can be regulated with almost mathematical certainty by changing the length of the lifter straps 22. If it is desired to delay the time of forming the loop 71, the lifter straps 22 may be lengthened. In practice I have found the actuator strap 2 should be supported approximately 38 to 40 inches above the runway. From a great many tests, I have found this control of the performance of the loop 71 is impossible without my tension wave control means as set forth above.

Having described my invention, what I regard as new and desire to protect by Letters Patent is:

1. An aircraft barrier comprising support means at opposite sides of an aircraft runway, an actuator cable, connecting means releasably supporting said actuator cable between said support means in spaced relation to said runway and in the path of travel of landing aircraft and releasable upon engagement of said actuator cable with the forward part of a moving aircraft, an arresting cable lying in a slack condition in contact with said runway and substantially parallel to said stretched actuator cable, a pair of control cables, one end of each of the control cables being connected with fixed points adjacent opposite sides of said runway, the other ends of each of said control cables being connected with said arresting cable, and releasable connecting means disposed in each of said control cables and releasable upon the exertion of a predetermined pull thereon, the portions of said control cables immediately adjacent said arresting cable lying in a slack condition on the surface of the runway, a plurality of lifter straps normally connecting said stretched actuator cable to said arresting cable, said lifter straps including releasable means connecting said straps with said arresting cable and releasable upon a predetermined pull on said straps by engagement of said stretched actuator cable with the forward part of the moving aircraft in landing.

2. An aircraft barrier as set forth in claim 1 wherein the arresting cable is attached to a drag means and is adapted to pick up the drag means after the connecting means securing said arresting cable to the fixed points adjacent the level of the runway has been released.

3. An aircraft barrier as set forth in claim 1 wherein the connecting means for releasably supporting said actuator cable between said support means is formed by a shear pin.

4. An aircraft barrier as set forth in claim 1 wherein intermediate support members are attached to said stretched actuator cable and to said runway, said support members normally maintaining said stretched actuator cable in said spaced relationship to said runway, said support members being releasable upon engagement of said stretched actuator cable by engagement with the forward part of the moving aircraft in landing.

5. An aircraft barrier as set forth in claim 1 wherein intermediate supports are attached to said stretched cable and to said runway and comprise a cap attached to said stretched actuator cable, a cylindrical body portion inserted at its upper end into said cap, a holder for said body portion attached to said runway and detachably holding the lower end of said body portion, trigger means mounted on said holder and releasably engaging said body portion, means interconnecting said trigger means with said cap, whereby said trigger means is actuated upon engagement of said stretched actuator cable by the forward part of said moving aircraft in landing for releasing said body portion from said holder.

6. In a barrier as set forth in claim 1, means for raising and lowering said support means whereby the stretched actuator cable is correspondingly raised and lowered.

7. An aircraft barrier comprising a stanchion located at each side of an aircraft runway, an actuator cable, connecting means for normally securing said actuator cable between said stanchions in raised position at an elevation above said aircraft runway and in the path of travel of landing aircraft such as to engage the forward part of the aircraft when landing, said connecting means having parts releasable upon engagement of said actuator cable with said forward part of the aircraft, an arresting cable lying in a slack condition in contact with the surface of said runway and substantially parallel to said suspended actuator cable, means attached to said arresting cable for absorbing the energy of the moving aircraft as the same is brought to a stop, connecting means having a predetermined limited amount of slack therein and normally securing said arresting cable at points adjacent opposite ends of said cable to fixed points adjacent opposite sides of said runway, said connecting means having parts for resisting tension forces created in said arresting cable under the action of said actuator cable and releasable upon a predetermined pull created by engagement of the forward part of the moving aircraft in landing with said arresting cable.

8. An aircraft runway barrier comprising a pair of spaced supports, an arresting cable lying on the runway in a slack condition, an actuator cable extending between the supports above said arresting cable and releasably connected at each end thereof to the supports, a plurality of lifter straps depending from said actuator cable at spaced intervals and releasably connected to said arresting cable, energy absorbing means connected to said arresting cable at each end thereof respectively, and a pair of elongated flexible members each affixed at one end thereof at opposite sides of the runway and having the opposite end thereof releasably connected to said arresting cable adjacent one end of the latter, said members each contacting the runway at a point intermediate the ends thereof.

References Cited in the file of this patent

UNITED STATES PATENTS

| 2,375,443 | Sarchet | May 8, 1945 |
| 2,440,574 | Cotton | Apr. 27, 1948 |
| 2,450,328 | Cotton | Sept. 28, 1948 |

FOREIGN PATENTS

| 569,149 | Great Britain | May 7, 1945 |

OTHER REFERENCES

"American Society of Naval Engineers Journal" (VM-1-A15), vol. 61, No. 2, May 1949, pp. 319–331, on page 330.